United States Patent
Teotia et al.

(10) Patent No.: US 10,803,039 B2
(45) Date of Patent: Oct. 13, 2020

(54) METHOD FOR EFFICIENT PRIMARY KEY BASED QUERIES USING ATOMIC RDMA READS ON CACHE FRIENDLY IN-MEMORY HASH INDEX

(71) Applicant: Oracle International Corporation, Redwood Shores, CA (US)

(72) Inventors: Siddharth Teotia, Foster City, CA (US); Krishna Kunchithapadam, Portland, OR (US); Jesse Kamp, Castro Valley, CA (US); Tirthankar Lahiri, Palo Alto, CA (US); Michael J. Gleeson, Saratoga, CA (US); Juan R. Loaiza, Woodside, CA (US); Garret F. Swart, Palo Alto, CA (US); Neil J. S. MacNaughton, Los Gatos, CA (US); Kam Shergill, Maidenhead (GB)

(73) Assignee: Oracle International Corporation, Redwood Shores, CA (US)

( * ) Notice: Subject to any disclaimer, the term of this patent is extended or adjusted under 35 U.S.C. 154(b) by 137 days.

(21) Appl. No.: 15/606,322

(22) Filed: May 26, 2017

(65) Prior Publication Data
US 2018/0341653 A1    Nov. 29, 2018

(51) Int. Cl.
*G06F 12/1045*    (2016.01)
*G06F 15/173*    (2006.01)
(Continued)

(52) U.S. Cl.
CPC ...... *G06F 16/2255* (2019.01); *G06F 12/1063* (2013.01); *G06F 15/17331* (2013.01); *G06F 16/907* (2019.01)

(58) Field of Classification Search
CPC ............... G06F 16/2255; G06F 16/907; G06F 15/17331; G06F 12/1063
(Continued)

(56) References Cited

U.S. PATENT DOCUMENTS

| 4,425,615 A | 1/1984 | Swenson et al. |
| 5,095,421 A | 3/1992 | Freund |

(Continued)

FOREIGN PATENT DOCUMENTS

| EP | 0 501 180 A | 9/1992 |
| GB | 2409 301 A | 6/2005 |

(Continued)

OTHER PUBLICATIONS

Tao, U.S. Appl. No. 15/720,972, filed Sep. 29, 2017, Office Action, dated Sep. 13, 2018.

(Continued)

*Primary Examiner* — Abdullahi E Salad
(74) *Attorney, Agent, or Firm* — Hickman Palermo Becker Bingham LLP

(57) ABSTRACT

Techniques are provided for enabling a requesting entity to retrieve data that is managed by a database server instance from the volatile memory of a server machine that is executing the database server instance. The techniques allow the requesting entity to retrieve the data from the volatile memory of the host server machine without involving the database server instance in the retrieval operation. Because the retrieval does not involve the database server instance, the retrieval may succeed even when the database server instance has stalled or become unresponsive. In addition, direct retrieval of data using the techniques described herein will often be faster and more efficient than retrieval of the same information through conventional interaction with the database server instance.

30 Claims, 5 Drawing Sheets

(51) Int. Cl.
*G06F 16/22* (2019.01)
*G06F 16/907* (2019.01)

(58) Field of Classification Search
USPC ........................................................ 709/203
See application file for complete search history.

(56) References Cited

U.S. PATENT DOCUMENTS

| | | |
|---|---|---|
| 5,241,675 A | 8/1993 | Sheth et al. |
| 5,263,156 A | 11/1993 | Bowen et al. |
| 5,287,496 A | 2/1994 | Chen et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,423,037 A | 6/1995 | Hvasshovd |
| 5,454,102 A | 9/1995 | Tang et al. |
| 5,553,279 A | 9/1996 | Goldring |
| 5,555,404 A | 9/1996 | Torbj.oslashed.rnsen et al. |
| 5,559,991 A | 9/1996 | Kanfi |
| 5,566,315 A | 10/1996 | Milillo et al. |
| 5,574,906 A | 11/1996 | Morris |
| 5,581,753 A | 12/1996 | Terry et al. |
| 5,603,024 A | 2/1997 | Goldring |
| 5,613,113 A | 3/1997 | Goldring |
| 5,649,156 A | 7/1997 | Vishlitzky et al. |
| 5,717,893 A | 2/1998 | Mattson |
| 5,774,643 A | 6/1998 | Lubbers |
| 5,806,076 A | 9/1998 | Ngai et al. |
| 5,870,758 A | 2/1999 | Bamford et al. |
| 5,870,761 A | 2/1999 | Demers et al. |
| 5,893,086 A | 4/1999 | Schmuck |
| 5,924,096 A | 7/1999 | Draper et al. |
| 5,943,689 A | 8/1999 | Tamer |
| 5,951,695 A | 9/1999 | Kolovson |
| 5,953,719 A | 9/1999 | Kleewein |
| 5,956,731 A | 9/1999 | Bamford et al. |
| 5,974,427 A | 10/1999 | Reiter |
| 5,983,277 A | 11/1999 | Heile et al. |
| 5,991,771 A | 11/1999 | Falls et al. |
| 6,014,669 A | 1/2000 | Slaughter et al. |
| 6,122,630 A | 9/2000 | Strickler et al. |
| 6,192,377 B1 | 2/2001 | Ganesh et al. |
| 6,298,319 B1 | 10/2001 | Heile et al. |
| 6,353,835 B1 | 3/2002 | Lieuwen |
| 6,370,622 B1 | 4/2002 | Chiou et al. |
| 6,393,485 B1 | 5/2002 | Chao et al. |
| 6,457,105 B1 | 9/2002 | Spencer et al. |
| 6,516,327 B1 | 2/2003 | Zondervan et al. |
| 6,526,483 B1 | 2/2003 | Cho et al. |
| 6,574,717 B1 | 6/2003 | Ngai et al. |
| 6,611,898 B1 | 8/2003 | Slattery et al. |
| 6,691,139 B2 | 2/2004 | Ganesh et al. |
| 6,728,823 B1 | 4/2004 | Walker et al. |
| 6,839,751 B1 | 1/2005 | Dietz et al. |
| 6,922,754 B2 | 7/2005 | Liu et al. |
| 7,024,656 B1 | 4/2006 | Ahad |
| 7,031,994 B2 | 4/2006 | Lao et al. |
| 7,069,324 B1 | 6/2006 | Tiwana et al. |
| 7,076,508 B2 | 7/2006 | Brourbonnais et al. |
| 7,159,076 B2 | 1/2007 | Madter |
| 7,165,144 B2 | 1/2007 | Choubal et al. |
| 7,222,136 B1 | 5/2007 | Brown et al. |
| 7,287,034 B2 | 10/2007 | Wong et al. |
| 7,290,017 B1 | 10/2007 | Wang et al. |
| 7,290,090 B2 | 10/2007 | Madter |
| 7,415,723 B2 | 8/2008 | Pandya |
| 7,461,147 B1 | 12/2008 | Mowat et al. |
| 7,464,113 B1 | 12/2008 | Girkar et al. |
| 7,496,589 B1 | 2/2009 | Jain et al. |
| 7,506,103 B2 | 3/2009 | Madter |
| 7,548,898 B1 | 6/2009 | Tarenskeen et al. |
| 7,558,290 B1 | 7/2009 | Nucci |
| 7,570,451 B2 | 8/2009 | Bedillion et al. |
| 7,627,612 B2 | 12/2009 | Ahal et al. |
| 7,636,814 B1 | 12/2009 | Karr et al. |
| 7,644,084 B2 | 1/2010 | Rapp |
| 7,660,945 B1 | 2/2010 | Lee |
| 7,725,559 B2 | 5/2010 | Landis |
| 7,769,802 B2 | 8/2010 | Smith |
| 7,774,568 B2 | 8/2010 | Sudhakar |
| 7,836,262 B2 | 11/2010 | Gunna et al. |
| 7,904,562 B2 | 3/2011 | Takase et al. |
| 7,912,051 B1 | 3/2011 | Rowlands et al. |
| 7,921,686 B2 | 4/2011 | Bagepalli |
| 7,966,293 B1 | 6/2011 | Owara et al. |
| 8,145,838 B1 | 3/2012 | Miller et al. |
| 8,244,984 B1 | 8/2012 | Glasco et al. |
| 8,266,472 B2 | 9/2012 | Bose |
| 8,327,080 B1 | 12/2012 | Der |
| 8,327,186 B2 | 12/2012 | Coatney |
| 8,359,429 B1 | 1/2013 | Sharma et al. |
| 8,370,452 B2 | 2/2013 | Harvell et al. |
| 8,566,297 B1 | 10/2013 | Dowers |
| 8,627,136 B2 | 1/2014 | Shankar |
| 8,683,139 B2 | 3/2014 | Gaither |
| 8,706,687 B2 | 4/2014 | Fineberg |
| 8,832,142 B2 | 9/2014 | Marwah et al. |
| 9,003,159 B2 | 4/2015 | Deshkar |
| 9,075,710 B2 | 7/2015 | Talagala |
| 9,164,702 B1* | 10/2015 | Nesbit ..................... G06F 3/067 |
| 9,256,542 B1 | 2/2016 | Flower |
| 9,263,102 B2 | 2/2016 | Flynn |
| 9,292,564 B2 | 3/2016 | Kamp et al. |
| 9,448,901 B1* | 9/2016 | Aslam ............... G06F 15/17331 |
| 9,836,368 B2 | 12/2017 | Keremane |
| 9,977,760 B1* | 5/2018 | Diehl ................. G06F 15/17331 |
| 10,353,734 B2 | 7/2019 | Busaba |
| 10,599,435 B2 | 3/2020 | Greiner |
| 2002/0038384 A1 | 3/2002 | Khan |
| 2002/0059287 A1 | 5/2002 | Karasudani |
| 2002/0133508 A1 | 9/2002 | Larue et al. |
| 2002/0165724 A1 | 11/2002 | Bartus |
| 2003/0005223 A1 | 1/2003 | Coulson |
| 2003/0115324 A1 | 6/2003 | Blumenau |
| 2003/0217236 A1 | 11/2003 | Rowlands |
| 2004/0054860 A1 | 3/2004 | Dixit |
| 2004/0073754 A1 | 4/2004 | Cypher |
| 2004/0117441 A1 | 6/2004 | Liu et al. |
| 2004/0122910 A1 | 6/2004 | Douglass et al. |
| 2004/0148486 A1 | 7/2004 | Burton |
| 2004/0193574 A1 | 9/2004 | Suzuki |
| 2004/0199552 A1 | 10/2004 | Ward et al. |
| 2004/0225719 A1 | 11/2004 | Kisley et al. |
| 2004/0225720 A1 | 11/2004 | Pinkerton |
| 2004/0225845 A1 | 11/2004 | Kruckemyer et al. |
| 2004/0230753 A1 | 11/2004 | Amiri |
| 2004/0254943 A1 | 12/2004 | Malcolm |
| 2004/0268177 A1 | 12/2004 | Ji et al. |
| 2005/0132017 A1 | 6/2005 | Biran et al. |
| 2005/0160224 A1 | 7/2005 | Cuomo et al. |
| 2005/0193160 A1 | 9/2005 | Bhatte et al. |
| 2005/0198062 A1 | 9/2005 | Shapiro |
| 2005/0210202 A1 | 9/2005 | Choubal et al. |
| 2006/0004691 A1 | 1/2006 | Sifry |
| 2006/0010130 A1 | 1/2006 | Leff et al. |
| 2006/0064441 A1 | 3/2006 | Yamamoto |
| 2006/0106890 A1 | 5/2006 | Paul et al. |
| 2006/0136570 A1* | 6/2006 | Pandya .................... H04L 63/20 |
| | | 709/217 |
| 2006/0146814 A1 | 7/2006 | Shah et al. |
| 2006/0209444 A1 | 9/2006 | Song |
| 2006/0212481 A1 | 9/2006 | Stacey et al. |
| 2006/0218123 A1 | 9/2006 | Chowdhuri et al. |
| 2006/0271605 A1 | 11/2006 | Petruzzo |
| 2006/0271740 A1 | 11/2006 | Mark |
| 2007/0038689 A1 | 2/2007 | Shinkai |
| 2007/0006757 A1 | 3/2007 | Morris et al. |
| 2007/0067575 A1 | 3/2007 | Morris et al. |
| 2007/0078914 A1 | 4/2007 | Correl |
| 2007/0078940 A1 | 4/2007 | Fineberg et al. |
| 2007/0083505 A1 | 4/2007 | Ferrari et al. |
| 2007/0226277 A1 | 9/2007 | Holenstein et al. |

(56) References Cited

U.S. PATENT DOCUMENTS

| | | |
|---|---|---|
| 2007/0237491 A1 | 10/2007 | Cattell |
| 2007/0239790 A1* | 10/2007 | Cattell ................ G06F 11/1666 |
| 2007/0239791 A1 | 10/2007 | Cattell |
| 2007/0239797 A1* | 10/2007 | Cattell .................. G06F 16/217 |
| 2007/2397970 | 10/2007 | Cattell |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0098044 A1 | 4/2008 | Todd |
| 2008/0104329 A1 | 5/2008 | Gaither et al. |
| 2008/0155303 A1 | 6/2008 | Toeroe |
| 2008/0177803 A1 | 7/2008 | Fineberg et al. |
| 2008/0209009 A1 | 8/2008 | Katwala et al. |
| 2008/0215580 A1 | 9/2008 | Altinel et al. |
| 2008/0219575 A1 | 9/2008 | Wittenstein |
| 2008/0222136 A1 | 9/2008 | Yates |
| 2008/0222159 A1 | 9/2008 | Aranha et al. |
| 2008/0235479 A1 | 9/2008 | Scales |
| 2008/0222111 A1 | 12/2008 | Hoang et al. |
| 2009/0138944 A1 | 5/2009 | Rajasekaran |
| 2009/0164536 A1 | 6/2009 | Nasre et al. |
| 2009/0171679 A1 | 7/2009 | Salgado et al. |
| 2009/0182960 A1 | 7/2009 | Crockett |
| 2009/0193189 A1 | 7/2009 | Carswell et al. |
| 2009/0235230 A1 | 9/2009 | Lucas |
| 2009/0240664 A1 | 9/2009 | Dinker et al. |
| 2009/0248871 A1 | 10/2009 | Takase et al. |
| 2009/0276479 A1 | 11/2009 | Lucas |
| 2009/0287737 A1 | 11/2009 | Hammerly |
| 2010/0017556 A1 | 1/2010 | Chin et al. |
| 2010/0036843 A1 | 2/2010 | MacNaughton et al. |
| 2010/0042587 A1 | 2/2010 | Johnson |
| 2010/0070448 A1 | 3/2010 | Omoigui |
| 2010/0095059 A1 | 4/2010 | Kisley et al. |
| 2010/0122026 A1 | 5/2010 | Umamageswaran et al. |
| 2010/0145909 A1 | 6/2010 | Ngo |
| 2010/0158486 A1 | 6/2010 | Moon |
| 2010/0199042 A1 | 8/2010 | Bates |
| 2010/0205367 A1 | 8/2010 | Ehrlich |
| 2010/0274962 A1 | 10/2010 | Moesk |
| 2010/0278446 A1 | 11/2010 | Ganesh et al. |
| 2010/0306234 A1 | 12/2010 | Wang et al. |
| 2010/0332654 A1 | 12/2010 | Bose |
| 2011/0022801 A1 | 1/2011 | Flynn |
| 2011/0029569 A1 | 2/2011 | Ganesh et al. |
| 2011/0040861 A1 | 2/2011 | Van der Merwe |
| 2011/0047330 A1 | 2/2011 | Potapov |
| 2011/0072217 A1 | 3/2011 | Hoang |
| 2011/0087637 A1 | 4/2011 | Sundaram et al. |
| 2011/0137861 A1* | 6/2011 | Burnett ............... G06F 16/2308 707/622 |
| 2011/0153719 A1 | 6/2011 | Santoro |
| 2011/0173325 A1 | 7/2011 | Cherian et al. |
| 2011/0191522 A1 | 8/2011 | Condict |
| 2011/0191543 A1 | 8/2011 | Craske et al. |
| 2011/0238899 A1 | 9/2011 | Yano |
| 2011/0258376 A1 | 10/2011 | Young |
| 2011/0320804 A1 | 12/2011 | Chan et al. |
| 2012/0013758 A1 | 1/2012 | Frederiksen |
| 2012/0017037 A1 | 1/2012 | Riddle |
| 2012/0054225 A1 | 3/2012 | Marwah |
| 2012/0054533 A1 | 3/2012 | Shi et al. |
| 2012/0063533 A1 | 3/2012 | Fonseka |
| 2012/0158729 A1 | 6/2012 | Mital |
| 2012/0173844 A1 | 7/2012 | Punde et al. |
| 2012/0221788 A1 | 8/2012 | Raghunathan |
| 2012/0265743 A1 | 10/2012 | Ivanova |
| 2012/0296883 A1 | 11/2012 | Ganesh |
| 2012/0323849 A1 | 12/2012 | Garin et al. |
| 2012/0323970 A1 | 12/2012 | Larson |
| 2012/0331243 A1* | 12/2012 | Aho ...................... G06F 15/167 711/154 |
| 2013/0007180 A1 | 1/2013 | Talpey et al. |
| 2013/0024433 A1 | 1/2013 | Amit |
| 2013/0132684 A1 | 5/2013 | Ostrovsky |
| 2013/0132705 A1 | 5/2013 | Ishii |
| 2013/0166534 A1 | 6/2013 | Yoon |
| 2013/0166553 A1 | 6/2013 | Yoon |
| 2013/0198312 A1 | 8/2013 | Tamir et al. |
| 2013/0212332 A1 | 8/2013 | Umamageswaran |
| 2013/0262613 A1* | 10/2013 | Hefty .................... G06F 15/167 709/212 |
| 2013/0275391 A1 | 10/2013 | Batwara |
| 2013/0326152 A1 | 12/2013 | Loaiza et al. |
| 2014/0089565 A1 | 3/2014 | Lee |
| 2014/0108751 A1 | 4/2014 | Brown |
| 2014/0149638 A1 | 5/2014 | Jain |
| 2014/0189032 A1* | 7/2014 | Sugimoto ......... G06F 15/17331 709/212 |
| 2014/0200166 A1 | 7/2014 | Van Rooyen |
| 2014/0281167 A1 | 9/2014 | Danilak |
| 2014/0281272 A1 | 9/2014 | Loaiza et al. |
| 2014/0304353 A1* | 10/2014 | Evans .................. H04N 21/643 709/212 |
| 2014/0325115 A1 | 10/2014 | Ramsundar |
| 2014/0337593 A1 | 11/2014 | Holbrook |
| 2015/0006813 A1 | 1/2015 | Goyal et al. |
| 2015/0012690 A1 | 1/2015 | Bruce |
| 2015/0012735 A1 | 1/2015 | Tamir et al. |
| 2015/0039712 A1 | 2/2015 | Frank et al. |
| 2015/0067088 A1* | 3/2015 | Guerin .................. G06F 15/167 709/213 |
| 2015/0089121 A1 | 3/2015 | Coudhury et al. |
| 2015/0089138 A1 | 3/2015 | Tao et al. |
| 2015/0089140 A1 | 3/2015 | Sridharan |
| 2016/0026605 A1* | 1/2016 | Pandit ...................... G06F 15/17 709/212 |
| 2016/0028819 A1* | 1/2016 | Schultz ............... H04L 67/1097 709/212 |
| 2016/0103767 A1 | 4/2016 | Banerjee et al. |
| 2016/0132411 A1 | 5/2016 | Jolad et al. |
| 2016/0188527 A1* | 6/2016 | Cherian ................ G06F 15/167 709/212 |
| 2016/0306923 A1 | 10/2016 | Van Rooyen |
| 2016/0328301 A1 | 11/2016 | Parakh et al. |
| 2017/0034270 A1* | 2/2017 | Nagasubramaniam ...................... H04L 67/1097 |
| 2017/0075856 A1* | 3/2017 | Suzue ............... G06F 15/17331 |
| 2017/0091246 A1* | 3/2017 | Risvik .................. G06F 16/182 |
| 2017/0103039 A1* | 4/2017 | Shamis ............. G06F 15/17331 |
| 2017/0109317 A1 | 4/2017 | Hack et al. |
| 2017/0124021 A1* | 5/2017 | Brown ................ H04L 67/1091 |
| 2017/0147507 A1* | 5/2017 | Horii ................. G06F 12/1081 |
| 2017/0149890 A1* | 5/2017 | Shamis ............... H04L 67/1097 |
| 2017/0149924 A1* | 5/2017 | Peterson ............. H04L 67/2852 |
| 2017/0192863 A1 | 7/2017 | Eluri |
| 2017/0277655 A1* | 9/2017 | Das ........................ G06F 3/061 |
| 2017/0300592 A1 | 10/2017 | Breslow |
| 2017/0357611 A1* | 12/2017 | Cherian ................ G06F 15/167 |
| 2018/0096049 A1* | 4/2018 | Kondiles ................. G06F 3/067 |
| 2018/0316760 A1* | 11/2018 | Chernin ............. H04L 67/1097 |
| 2018/0341596 A1 | 11/2018 | Teotia |
| 2019/0187916 A1* | 6/2019 | Romem ................ G06F 3/0611 |
| 2020/0042489 A1 | 2/2020 | Lahiri |

FOREIGN PATENT DOCUMENTS

| | | |
|---|---|---|
| WO | WO 91/18461 | 9/1993 |
| WO | WO 93/18461 | 9/1993 |
| WO | WO 2007/045839 A2 | 4/2007 |
| WO | WO2007/045839 A2 | 4/2007 |
| WO | WO2013/109640 A1 | 7/2013 |
| WO | WO 2015/094179 A1 | 6/2015 |
| WO | WO 2015/148100 A1 | 10/2015 |

OTHER PUBLICATIONS

Wikipedia, the free encyclopedia, "Cuckoo Hasing", https://en.wikipedia.org/wiki/Cuckoo_hashing, last viewed on Jul. 31, 2017, 7 pages.

Wang et al., "C-Hint: An Effective and Reliable Cache Management for RDMA-Accelerated Key-Value Stores", dated 2014, 2 pages.

(56) References Cited

OTHER PUBLICATIONS

Tyler Szepesi, et al. "Nessie: A Decoupled, Client-Driven, Key-Value Store using RDMA", Copyright 2015 the authors CS-2015-09, 13 pages.
Mitchell et al., "Using One-Sides RDMA Reads to Build a Fast, CPU-Efficient Key-Value Store", 12 pages.
Mitchell et al., "Using One-Sided RDMA Reads to Build a Fast, CPU-Efficient Key-Value Store", 2013 USENIX Annual Technical Conference (USENIX ATC '13), 12 pages.
Kalia et al., "Using RDMA Efficiently for Key-Value Services", SIGCOMM'14, Aug. 17-22, 2014, Chicago, IL, USA, 15 pages.
Kalia et al., "Using RDMA efficiently for key-value services", dated 2014, 2 pages.
Kalia et al., "Using RDMA Efficiently for Key-Value Services", ACM SIGVOMM, https://www.researchgate.net/publication/266659972_Using_RDMA_Eff, 5 pages, Aug. 2014.
Fan et al., "MemC3: Compact and Concurrent MemCache With Dumber Caching and Smarter Hashing", NSDI'13, dated Apr. 2013, 14 pages.
Dragojević, et al., "FaRM: Fast Remote Memory", https://www.usenix.org/conference/nsdi14/technical-sessions/dragojević, dated Apr. 2014, 15 pages.
Szepesi, Tyler, et al. "Designing a low-latency cuckoo hash table for write-intensive workloads using RDMA." First International Workshop on Rack-scale Computing. 2014, 6 pages.
Ailamaki, Anastassia, et al, "Weaving Relations for Cache Performance," Proceedings of the $27^{th}$ International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright ©2000, ISBN-0/8053-1755-4, pp. 32, 70, 118, 131-132, 134, 155-159, 170, 252-254, 558, 569-573, 591-592, and 789-790 (26 pgs).
Hilland et al., "RDMA Protocol Verbs Specification" Version 1.0), dated Apr. 25, 2003, 243 pages.
Culley P. et al., "An RDMA Protocol Specification" Internet Draft, dated Sep. 16, 2002, 58 pages.
Microsoft, "Database Instant File Initialization", SQL Server 2016, https://msdn.microsoft.com/en-us/library/ms175935.aspx, 3 pages.
Feng et al., "Accelerating Relational Databases by Leveraging Remote Memory and RDMA", Proceedings of the 2016 International Conference on Management of Data, SIGMOD, Jan. 1, 2016, pp. 355-370.
Aronovich et al., "The Design of a Similarity Based Deduplication System", Systor, 2009, 14 pages.
Forman et al., "Efficient Detection of Large-Scale Redundancy in Enterprise File Systems", dated Jan. 2009, 8 pages.
Bober, Paul M., et al., "On Mixing Queries and Transactions via Multiversion Locking", Computer Sciences Department, University of Wisconsin, 1992, pp. 535-545.
Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.
Harder Theo et al., "Database Caching—Towards a Cost Model for Populating Cache Groups," ADBIS 2004, LNCS 3255, A. Benczur, J. Demetrovics, 15 pages.
Oracle, Oracle Times Ten In-Memory Database API and SQI Reference Guide, Release 6.0, dated 2006, 37 pages.
Teschke et al., "Concurrent Warehouse Maintenance Without Comprising Session Consistency", University of Erlangen-Nuremberg., Pub 1998, 10 pages.
Vassilakis et al., "Implementation of Transaction and Concurrency Control Support in a Temporal DBMS", Department of Information Systems, University of Athens, vol. 23 No. 5. Pub 1998, 16 pages.
Oracle®, "TimesTen to TimesTen Replication Guide" Release 7.0, B31684-03, Sep. 2007. http://download.oracle.com/otn_hosted_doc/timesten/703/TimesTen-Documentation/replication.pdf.
Oracle®, "TimesTen to TimesTen In-Memory Database Introduction" Release 7.0, B31687-03, Sep. 2007. http://download.oracle.com/otn_hosted_doc/timesten/703/TimesTen-Documentation/intro.pdf.
Oracle® Clusterware, Administration and Deployment Guide, 11g Release 1 (11.1), B28255-06, Oct. 2008. http://download.oracle.com/docs/cd/B28359_01/rac.111/b28255.pdf.
The Times Ten Team, Mid-Tier Caching: the Times Ten Approach, Jun. 2002. ACM SIGMOD, 6 pages.
Bornhovd et al., "Adaptive Database Caching with DBCache", IEEE 2004, pp. 11-18.
The TimesTen Team, "High Performance and Scalability through Application-Tier, In-Memory Management", Proceedings of $26^{th}$ International Conference on Very Large Databases, Cairo, Egypt, 2000, pp. 677-680.
Fan et al., "MemC3: Compact and Concurrent MemCache with Dumber Caching and Smarter Hashing", To appear in Proceedings of the 10th USENIX Symposium on Networked Systems Design and Implementation (NSDI'13), Lombard, IL, dated Apr. 2013, 14 pages.

* cited by examiner

METHOD FOR EFFICIENT PRIMARY KEY BASED QUERIES USING ATOMIC RDMA READS ON CACHE FRIENDLY IN-MEMORY HASH INDEX

CROSS-REFERENCE TO RELATED APPLICATIONS

This application is related to application Ser. No. 15/606,327, filed May 26, 2017, the entire contents of which is hereby incorporated by reference as if fully set forth herein.

FIELD OF THE INVENTION

The present invention relates to retrieving data requested by a requesting entity and, more specifically, retrieving the data from the volatile memory of a server machine using remote direct memory access (RDMA).

BACKGROUND

Countless techniques have been developed to improve the efficiency of delivering to a client application the data that the client application requests from a server. Such techniques typically involve executing, on the server, a database server instance that receives the requests, gathers the requested data, and provides the data to the database application. Frequently, numerous client applications will send requests to the same database server instance. The greater the workload in the database server instance, the less likely the database server instance will be able to respond to all requests efficiently.

Unfortunately, if the database server instance that is executing on a server fails, the data in the volatile memory of the server typically becomes unavailable to client applications. Under these circumstances, the client applications must wait for the database server instance to be recovered or, when possible, obtain the data they require from other sources (e.g. by sending a request to another database server instance that has access to another copy of the desired data).

Based on the foregoing, it is desirable to reduce the work a database server instance performs to provide data to client applications. It is further desirable to provide a way for client applications to continue to access data from the volatile memory of a server even after the database server instance that is executing on the server fails.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
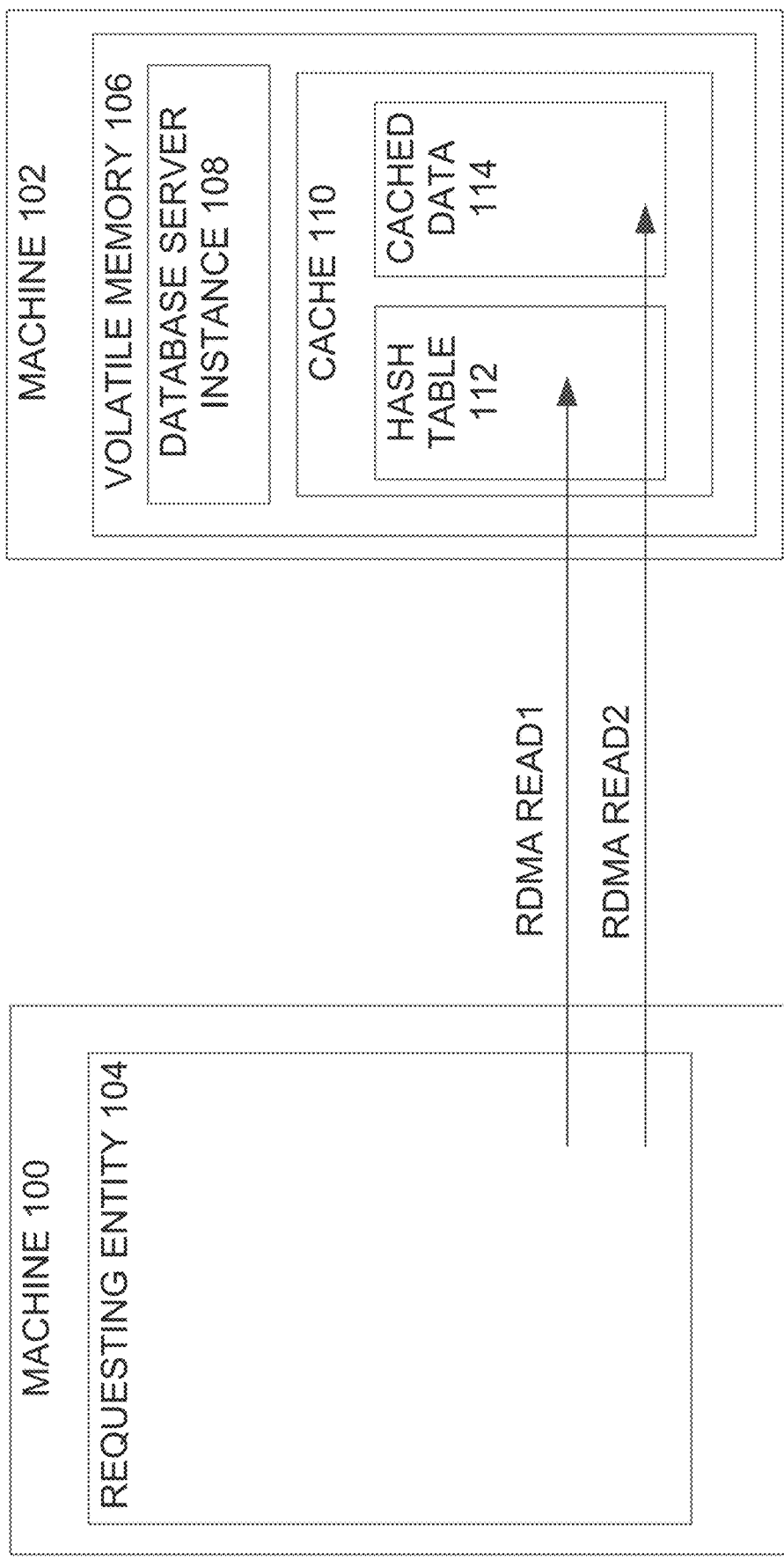
FIG. 1 is a block diagram of a system in which a requesting entity on one machine accesses data in volatile memory of another machine without involving the database server instance that manages the data, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for enabling a "requesting entity" to retrieve data that is managed by a database server instance from the volatile memory of a server machine that is executing the database server instance. The server machine whose volatile memory stores the data is referred to herein as the "host server machine". The techniques allow the requesting entity to retrieve the data from the volatile memory of the host server machine without involving the database server instance in the retrieval operation.

Because the retrieval does not involve the database server instance, the retrieval may succeed even when the database server instance (or the host server machine itself) has stalled or become unresponsive. In addition, direct retrieval of data using the techniques described herein will often be faster and more efficient than retrieval of the same information through conventional interaction with the database server instance.

The requesting entity may be any software entity that requires data that is managed by the database server instance. Such software entities may include, for example, database applications and other database server instances executing on machines other than the host server machine. The requesting entity may also be client-side database server code that is linked into a database application, or the combination of such code and the database application into which the code is linked.

According to an embodiment, an underlying network fabric allows the machine that is executing the requesting entity (the "client machine") to retrieve data from the volatile memory of the host server machine without involving the database server instance. Specifically, to retrieve "target data" specified in a database command, the requesting entity first uses Remote Direct Memory Access (RDMA) to access information about where the target data resides in the server machine. Information about where the target data resides in the volatile memory of the host server machine is referred to herein as "target location information". Based on the target location information, the requesting entity uses RDMA to retrieve the target data from the host server machine without involving the database server instance.

The RDMA reads (data retrieval operations) issued by the client machine or requesting entity are unilateral operations and do not require CPU interruption or OS kernel involvement on the host server machine (RDBMS server). That is, the RDMA reads are performed without any involvement of the remote database server instance.

System Overview

FIG. 1 is a block diagram of a system configured to enable a requesting entity to retrieve data that is managed by a database server instance from the volatile memory of a server machine that is executing the database server instance, without involving the database server instance in the retrieval operation. Referring to FIG. 1, a requesting entity 104 is executing on a machine 100. A database server instance 108 is executing on a different machine 102.

In the case where requesting entity 104 is a database application, requesting entity 104 conventionally retrieves target data by sending database commands to database server instance 108. Such is also the case where requesting entity 104 is another database server instance that requires information managed by database server instance 108. However, using the techniques described herein, some or all of the data required by requesting entity 104 may be obtained through RDMA access to the volatile memory 106 of machine 102.

In the embodiment illustrated in FIG. 1, the target data is a subset of the cached data 114 that resides in a cache 110 allocated within volatile memory 106. Cache 110 also includes a hash table 112 that includes information about where specific data items are stored within the cached data 114. As illustrated in FIG. 1, target data may be retrieved from cached data 114 by the requesting entity 104 first sending an RDMA to read target location information from hash table 112, and a second RDMA to read the target data from cached data 114. The RDMA made to obtain the target location information shall be referred to herein as the "for-location-RDMA" and the one or more RDMAs made to retrieve the target data shall be referred to herein as "for-data-RDMAs".

Functional Overview

Figure 2:
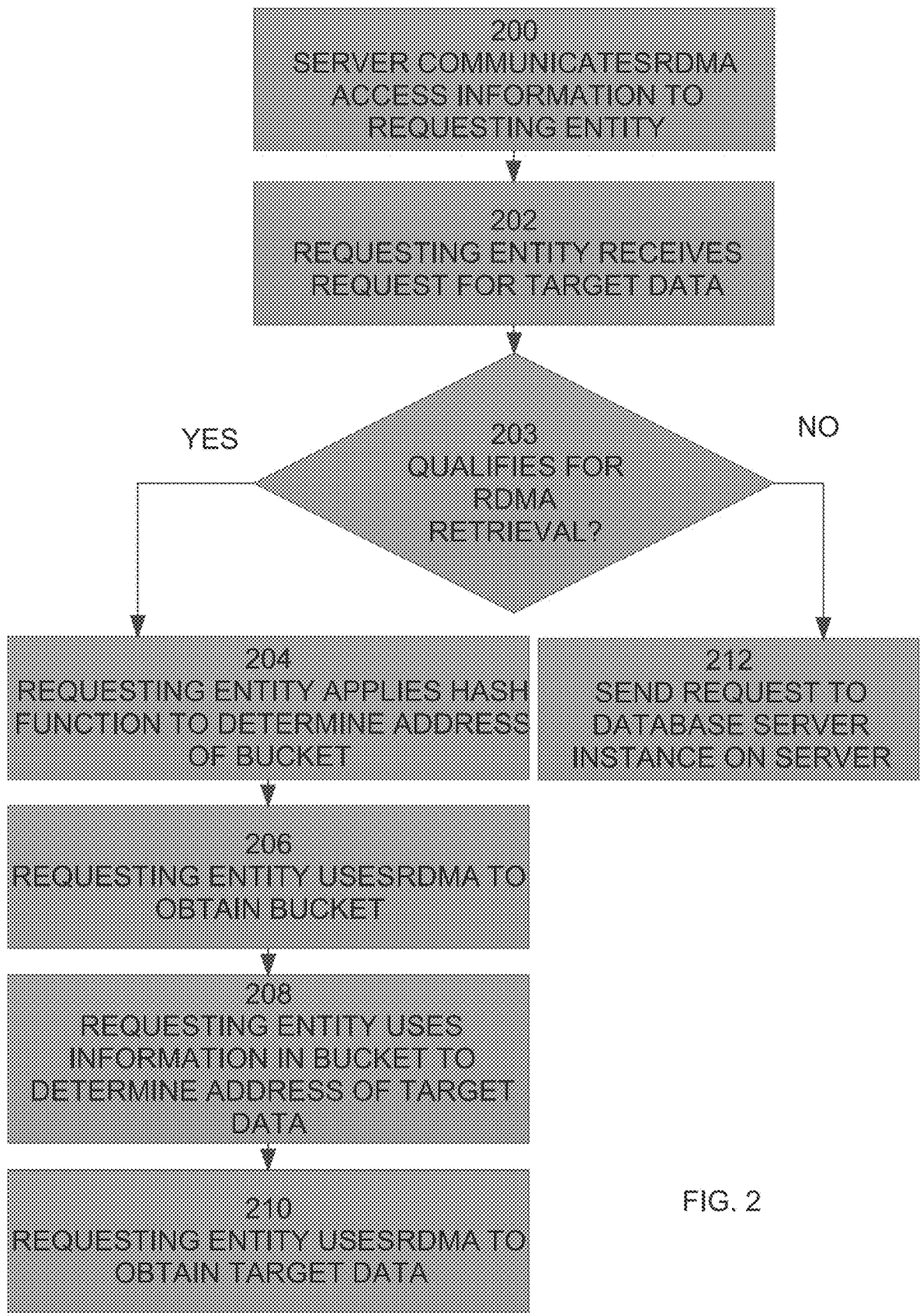
FIG. 2 is a flowchart illustrating steps for transferring data managed by a database server instance to a requesting entity without involving the database server instance.

FIG. 2 is a flowchart that illustrates how requesting entity 104 may retrieve data that is managed by database server instance 108 from volatile memory 106 without involving database server instance 108. Referring to FIG. 2, at step 200, machine 102 sends "RDMA access information" to requesting entity 104. The RDMA access information is typically sent by database server instance 108 during bootstrap before any remote access can happen. The term "RDMA access information" generally refers to the information that requesting entity 104 needs in order to determine (a) which data is available for RDMA retrieval, and (b) how to request the target location information for that data.

For the purpose of explanation, an embodiment shall be described in which the target location information is maintained in buckets within hash table 112. In such an embodiment, the RDMA access information may include information about which memory regions are available for reading directly via RDMA, and the base addresses and sizes of such regions that contain hash table 112 and cached data 114. Based on the RDMA access information, requesting entity 114 is able to determine the virtual address to use to retrieve data from any given bucket within hash table 112.

After obtaining the RDMA access information, the requesting entity 104 may use RDMA to retrieve any data items that the RDMA access information indicates are available for RDMA retrieval. All other data is retrieved by requesting entity 104 through conventional interaction with database server instance 108.

Referring again to FIG. 2, steps 202 to 212 indicate how requesting entity 104 handles requests for target data. Specifically, at step 202, requesting entity 104 receives a request for target data. For the purpose of illustration, it shall be assumed that the request is in the form "SELECT name FROM emp WHERE ssn=123-45-6789". In this example, the target data is the name of the employee whose social security number is 123-45-6789. The target data resides in the column "name" of the table "emp". The social security numbers reside in the column "ssn" of the same table "emp". For the purpose of explanation, it shall be assumed that "ssn" is the primary key of table "emp", and therefore is guaranteed to be unique.

At step 203, the requesting entity 104 determines whether the target data qualifies for RDMA retrieval. According to one embodiment, target data qualifies for retrieval when (a) the target data is in the cached data 114 and (b) the request is a point lookup based on a unique key.

For example, during step 203, requesting entity 104 may send a SQL command (e.g. "SELECT name FROM emp WHERE ssn=123-45-6789") to database server instance 108. Database server instance 108 determines how to execute (parses and compiles) the SQL command. In the present example, the database server instance 108 will determine EMP table has been designated by a user to use fast remote reads ("FAST-LOOKUP-OPTIMIZED"). Thus, the query compilation will take this into account and send back an appropriate handle for the SQL query. Specifically, the database server instance 108 then sends back to the requesting entity 104 a handle associated with the SQL command (which may be used by requesting entity 104 for subsequent executions of the SQL command to avoid the need to reparse and recompile the SQL command) that enables the data requested by the SQL command to be retrieved using RDMA. Based on the handles received from database server instance 108, the requesting entity 104 knows when to send a conventional request to database server instance 108, and when to use RDMA to retrieve the target data directly from volatile memory 106.

For the purpose of illustration, it shall be assumed that the entire "emp" table is available for RDMA retrieval, and that social security number is a unique key. Therefore, control passes from 203 to 204. Otherwise, control would pass from 203 to 212 and the requesting entity 104 would request the target data through conventional interaction with database server instance 108. Although only a single table is available in the RDMA example given herein, the techniques described herein are not limited relative to the number of tables or other database objects that are made available via RDMA. In situations where multiple tables are made available via RDMA, each such table may have a corresponding hash table similar to hash table 112.

At step 204, the hash function is applied to the unique key value associated with the target data (i.e. 123-45-6789) to generate a hash value that corresponds to a hash bucket of hash table 112. Once a hash bucket that corresponds to the unique key of the target data has been identified, a bucket-to-address mapping is consulted to determine the address from which to retrieve the target location information.

At step 206, requesting entity 104 sends a for-location-RDMA to obtain bucket data from the identified bucket from hash table 112. At step 208, requesting entity 104 uses information contained in the bucket data to determine the location of the target data. Specifically, at step 208, requesting entity 104 locally parses the bucket retrieved via RDMA to determine the location of the target data. At step 210, requesting entity 104 uses the location of the target data to perform an RDMA to retrieve the target data from cached data 114.

The Cached Data

Typically, volatile memory 106 will not be large enough to hold all of the data that is managed by database server instance 108. Therefore, according to an embodiment, upon start-up, database server instance 108 scans a database dictionary (not shown) to determine which data objects to pre-load into cache 110. The data dictionary will indicate which database objects/tables a user has enabled for fast remote lookups/reads. The database dictionary may be populated with such information, for example, based on arguments of the Data Dictionary Language (DDL) commands used to create the database objects.

After a database object has been created, an "ALTER TABLE" DDL statement may be issued to add the "FAST-LOOKUP-OPTIMIZED" designation to a database object that was not FAST-LOOKUP-OPTIMIZED when created. In response to such a command, the data dictionary is updated and the target database object is loaded into cache 110.

Figure 3:
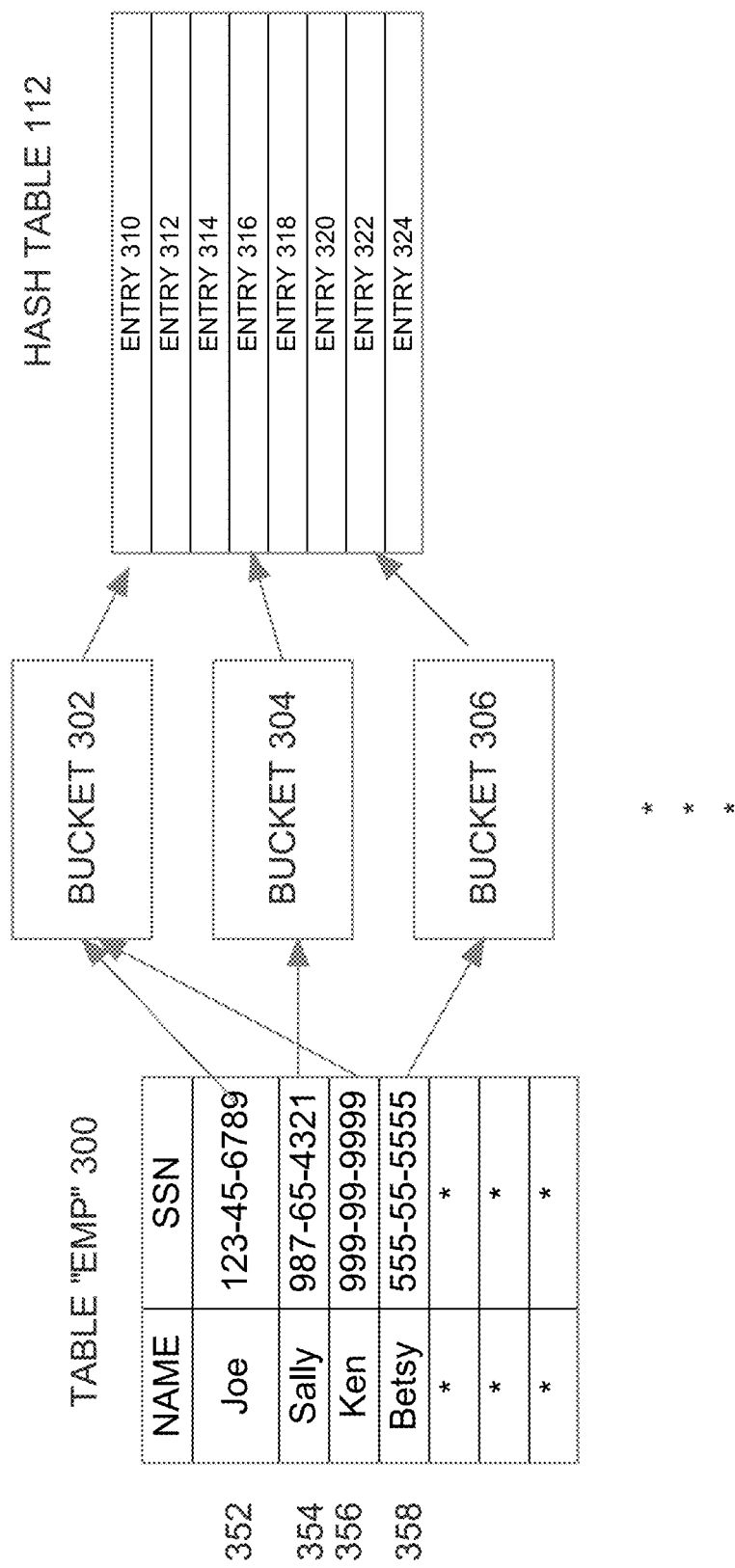
FIG. 3 is a block diagram illustrating how rows of a table may be hashed to a hash table, according to an embodiment.

For the purpose of illustration, it shall be assumed that the "emp" table 300 illustrated in FIG. 3 is one of the tables designated as FAST-LOOKUP-OPTIMIZED. Consequently, the database dictionary used by database server instance 108 includes information that indicates that emp table 300 is FAST-LOOKUP-OPTIMIZED. In this example, the FAST-LOOKUP-OPTIMIZED designation is made at the table level of granularity. However, the FAST-LOOKUP-OPTIMIZED designation may be at any level of granularity, including entire tables, partitions of tables, etc.

Once database server instance 108 determines which tables are FAST-LOOKUP-OPTIMIZED, database server instance 108 scans the blocks of the on-disk copy of those tables, and loads the scanned blocks into volatile memory 106. The blocks scanned from disk are brought into cache and locked and pinned such that they are never thrown out of volatile memory 106 unless all requesting entities are informed of the change. The blocks may be evicted from memory, after informing all requesting entities, in situations where the database server instance 108 needs to use the volatile memory for other purposes. One such other purpose may be, for example, to load a different, more frequently accessed database object, for FAST-LOOKUP.

Referring to FIG. 3, it illustrates the logical organization of emp table 300 on disk. In the illustrated embodiment, emp table 300 is organized into two columns: "name" and "ssn". The "ssn" column is subject to a uniqueness constraint, which prevents rows from having the same ssn value. In this example, a single column is used as the unique key. However, unique keys can be composite keys, composed of values from any number of columns. While emp table 300 is logically organized as illustrated in FIG. 3, the values that populate emp table 300 are physically stored on disk in disk blocks. As mentioned above, when database server instance 108 determines that table emp 300 is FAST-LOOKUP-OPTIMIZED, those blocks are scanned from disk and loaded into cache 110.

Figure 4:
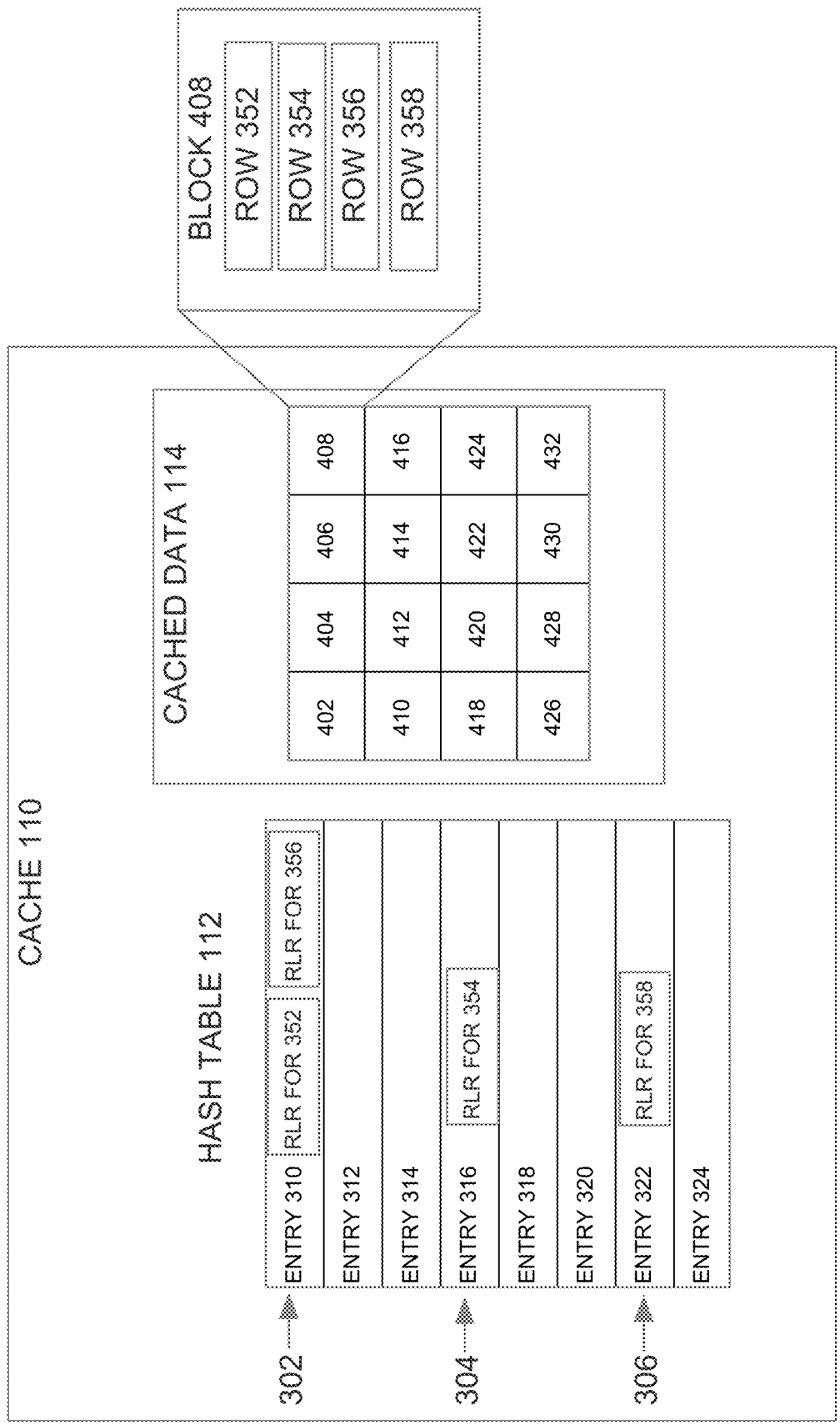
FIG. 4 is a block diagram illustrating a hash table and cached data may that a requesting entity is able to access without involving the database server instance that manages the cached data.

FIG. 4 is a block diagram that illustrates how data from the rows of table emp 300 are loaded into cache 110 as a set of blocks 402-432. According to an embodiment, each of blocks 402-432 is 8K bytes, and can store the data from multiple rows of emp table 300. In FIG. 4, an expanded view of block 408 shows that block 408 includes the data from four rows 352-358 of emp table 300. After being loaded, blocks 402-432 are locked to prevent blocks 402-432 from being replaced within cache 110 to make room to load additional data into cache 110.

The Hash Table

According to an embodiment, as the blocks of a FAST-LOOKUP-OPTIMIZED database object are loaded into volatile memory 106, the database server instance 108 builds a hash table 112 with information for accessing the data items within those blocks. According to one embodiment, hash table 112 contains an entry for each bucket, and each entry can store location information for locating multiple rows. The data, within a hash table entry, for locating a given row shall be referred to therein as the "row locator record" of the row. In one embodiment, each bucket is a "fat" bucket that stores a maximum of three row locator records. The specific pieces of information contained in the row locator record may vary from implementation to implementation. Examples of types of information that may be included in the row locator record shall be described in greater detail hereafter.

In the embodiment illustrated in FIG. 3, hash table 112 includes entries 310-324, each of which correspond to a bucket. Specifically, entries 310, 316 and 322 respectively correspond to buckets 302, 304 and 306.

The population of hash table 112 shall be illustrated with reference to block 408. When block 408 is loaded into cache 110, database server instance 108 performs the following for each row in the block:
  reads the unique key value of the row by walking the row and extracting the values of key column(s)
  generates a hash value by applying a hash function to the unique key value
  determines the hash bucket that corresponds to the hash value using some Least Significant Bits (LSBs) from the hash value
  stores a row locator record for locating the row in the hash table entry that corresponds to the bucket.

For example, in response to loading block 408, the database server instance 108 applies a hash function to 123-45-6789 (the unique key of row 352). According to an embodiment, the hash function produces a 64-bit hash value. If there are 1024 buckets in hash table 112, the ten least significant bits of the hash value may be used to as the bucket index to determine the bucket number to which the key value maps. As illustrated in FIG. 3, the resulting bucket index corresponds to bucket 302. Therefore, row locator record for row 352 is stored in entry 310 of hash table 112.

After storing row locator record for row 352 in entry 310, the database server instance 108 then applies the hash function to 987-65-4321 (the unique key of row 354). As illustrated in FIG. 3, the resulting hash value corresponds to bucket 304. Therefore, row locator record for row 354 is stored in entry 316 of hash table 112.

After storing row locator record for row 354 in entry 316, the database server instance 108 then applies the hash function to 999-99-9999 (the unique key of row 356). As illustrated in FIG. 3, the resulting hash value corresponds to bucket 302. Therefore, the row locator record for row 356 is stored in entry 310 of hash table 112.

After storing row locator record for row 356 in entry 310, the database server instance 108 then applies the hash function to 555-55-5555 (the unique key of row 358). As illustrated in FIG. 3, the resulting hash value corresponds to bucket 306. Therefore, the row locator record for row 358 is stored in entry 322 of hash table 112.

FIG. 4 shows hash table 112 after hash table 112 has been populated with the row locator records for the rows in block 408. Specifically, entry 310 contains the row locator records for rows 352 and 356, entry 316 contains the row locator record for row 354, and entry 322 contains the row locator record for row 358.

Hash table entries have finite space. Therefore, it is possible for a row to hash to a bucket whose hash table entry does not have enough space for the row locator record of the row. According to one embodiment, when this occurs, the database server instance 108 simply stores the row locator record in the hash table entry for the next bucket. As shall be explained below, if there is no room in the next bucket it may not be stored in the hash table at all. Thus, if the row locator record for a row that hashes to bucket 302 does not fit in entry 310, then the row locator record is instead stored in entry 312. One embodiment implements the concept of "two buddy buckets". In such an embodiment, if a key K hashes to bucket B, then either it will be in bucket B or next adjacent bucket B+1 if B is full. This knowledge is known both during building the hash table and inserting RLRs and querying the hash table for SELECT queries. Consequently, the cost of SELECT query (lookup operation) is guaranteed to be a constant time operation. In such an embodiment, if the requesting entity 104 cannot find a row locator record for keyX in the bucket data of the bucket to which keyX hashes, then the requesting entity 104 searches for the row locator record in the next bucket.

According to one embodiment, the hash table entries are stored contiguously within cache 110. In such an embodiment, the initial for-location-RDMA may retrieve both (a) the entry that corresponds to the bucket to which the key value hashes, and (b) the entry for the next bucket. In such an embodiment, if the entry to which the key hashes does not have a matching row locator record, then the row locator record can be obtained from the following entry without the need to issue an additional for-location-RDMA. In other words, both the buddy buckets can be read in a single RDMA read operation and then the requesting entity can locally figure out which bucket has the key it is looking for.

In one embodiment, when building the hash table 112, if there is insufficient space to store the row locator record for a row in either the bucket to which the row's key hashes, or in the bucket that follows that bucket, then no row locator record for that row is created. In such and embodiment, when the requesting entity 104 is unable to find the row locator record for a key value in either the bucket to which the key value hashes, or the next bucket, the requesting entity 104 obtains the row using conventional interaction with the database server instance 108.

In one embodiment, the database server instance tracks how many times row locator records do not fit their corresponding bucket or the next bucket. If the number exceeds a threshold, then the hash table is rebuilt using a larger number of buckets (which may require more bits of the hash values to be used as the bucket indexes). In one embodiment, a larger hash table is built if the row locator records of any rows do not fit in the corresponding bucket or the next bucket. Such an embodiment ensures that a row locator record for every row will always be present in the hash table.

The Row Locator Record

As mentioned above, "row locator record" is the information stored in a hash table entry for locating a row that hashes to the bucket that corresponds to the hash table entry. According to an embodiment, the row locator record for a row includes:
  a "tag" (2 bytes)
  rdba (4 bytes): an on-disk block address of the disk block containing the row
  objd (4 bytes): an identifier of the database object (e.g. emp table 300) that contains the row. Each object/table in the databas has a unique objd.
  block # (4 bytes): the number of the in-memory block (e.g. block 408) within the region of cache 110 that is storing the cached data 114
  slot # (2 bytes): the slot number of the row within the in-memory block.

How each of these pieces of information are used during the RDMA retrieval process is described in detail hereafter.

Using Tags to Resolve Collisions

The "tag" that is stored in the row locator record of a row is used to resolve collisions when the unique keys of multiple rows hash to the same bucket. The tag for a row may be bits extracted from the hash value produced by the row's key value. For example, assume that hash table 112 has 16 buckets. Under this assumption, only four bits of the hash value are needed to identify a bucket. If the hash value produced by the hash function is larger than four bits, then some of those additional bits may be used as the "tag" for the row. According to an embodiment, the hash function used to generate hash values produces hash values that are large enough to include both bits for identifying a bucket and bits that serve as tags to resolve collisions. In one embodiment, the hash values thus generated are 64 bits in size.

For the purpose of illustration, assume that the hash value produced by 123-45-6789 is 0110010000, and that the hash value produced by 999-99-9999 is 1010110000. In this case, if the last four bits are used to pick the bucket, then both key values will hash to the bucket that corresponds to "0000" (e.g. bucket 302). However, if bits three through six are used as the tag, then within the hash table entry for bucket 302 (i.e. entry 310) the row locator record for row 352 will have tag "1001" and the row locator record for row 356 will have tag "1011".

In this example, four bits are used as the bucket index, and four bits are used as the tag. However, the actual number of bits used for each purpose may vary from implementation to implementation. According to an embodiment, each hash value is 8 bytes and a tag is two bytes of the hash value. Initially, it is preferable for the tag not to include any of the bits of the hash value that are used to identify the hash bucket (the "bucket-identifying bits").

As mentioned above, the tag is used to resolve "collisions" when a hash table entry includes row locator records for multiple rows. For example, rows 352 and 356 have key values that produce different hash values, however the bucket-identifying bits of those hash values are the same. Consequently, as illustrated in FIG. 4, row locator records for both rows are stored in entry 310.

When trying to retrieve the row associated with the key 123-45-6789, the requesting entity 104 needs to determine which of the two row locator records is the right one for that key value. Even though multiple keys hash to the same bucket, it is highly likely that the bits of the hash values that are used as tags are different. Therefore, the requesting entity 104 may find the row locator record for the key value 123-45-6789 by selecting the row locator record within entry 310 has a tag that matches the tag produced by the hash of the key value 123-45-6789. In the example given above, the row locator record that has the tag "1100" would be selected, because those are the tag bits of the hash value produced by 123-45-6789.

It should be noted that even matching tags do not guarantee that a particular row locator record is the right row locator record for a given key value, because it is possible for different unique keys to produce both the same bucket-identifying bits and the same tag bits. Therefore, even when the tag produced by the hash of a key value matches the tag of a particular row locator record, the requesting entity 104 has to verify, after a row has been obtained through RDMA, that the row has a key value that matches the key value specified for the target data.

For example, in response to the command "SELECT name FROM emp WHERE ssn=123-45-6789", the requesting entity 104 uses the hash of 123-45-6789 to pick a bucket, and then uses RDMA to retrieve the bucket data for that bucket (entry 310) from hash table 112. The requesting entity 104 then uses the tag byte(s) produced by the hash of 123-45-6789 to pick, within the bucket data, a row locator record that matches the tag. Requesting entity 104 then uses the row locator record to perform a for-data-RDMA to retrieve the row that corresponds to that row locator record. Once that row is retrieved, requesting entity 104 compares the key value stored in the retrieved row with 123-45-6789 to ensure that the right row was retrieved.

In cases where the key value of the retrieved row is not identical to the key value designated for the target data, the requesting entity 104 may have to issue additional RDMA requests (e.g. if other row locator records in the same bucket also match the tag). Alternatively, the requesting entity 104 may obtain the target data through conventional interaction with database server instance 108. In one embodiment, when multiple row locator records, in the same bucket, match a key's tag, the requesting entity 104 may issue multiple RDMA's in parallel to retrieve the row data that corresponds to each of the matching row locator records. Once the rows are obtained, requesting entity 104 inspects the key values of the retrieved rows to determine which row is the actual target data.

Block Numbers

The block # that is contained in a row locator record is used by the requesting entity 104 to determine the virtual address of the in-memory block that contains the row for which the row locator record was created. Specifically, the requesting entity 104 causes the block # to be translated to a virtual memory address, and then sends the for-data-RDMA to retrieve the block located at that virtual address. In one embodiment, requesting entity 104 translates from block number to virtual memory address using a block-to-address map that was included in the RDMA access information set to requesting entity 104 by database server instance 108. As used herein, "virtual memory address" refers to the address form that is used by remote entities to perform RDMA operations. That address form may vary based on the underlying network fabric used to facilitate the RDMA communications.

Using block # in this manner is an optimization that makes hash table 112 more space efficient. In alterative embodiment, instead of block #, the virtual address itself is stored in row locator record. However, in such an embodiment, the size of each row locator record would increase, since a virtual address is 8 bytes whereas a block # is only 4 bytes. The larger the size row record locator, the lesser the number of records that can be packed into a single bucket and thus the higher the probability of a sub-optimal lookup performance.

Using the RDBA to Validate a Block

As mentioned above, the block number is translated into a virtual address that is used to retrieve the block containing the target data. However, there are circumstances where that virtual address causes retrieval of the wrong block. Specifically, the virtual address may retrieve the wrong block if, for example, the block that contains the row has been shifted away from its initial address, or the table containing the row has been dropped.

To address this situation, each row locator record also includes the on-disk block address (rdba) of the disk block containing the row for which the row locator record was created. When requesting entity 104 retrieves block data from cache 110 using RDMA, the requesting entity 104 compares the rdba stored in the row locator record with the rdba stored in the header of the retrieved block data. If the rdbas do not match, then an error has occurred and the requesting entity 104 initiates remedial measures. Requesting entity may, for example, resubmit the initial request to database server instance 108 to obtain the target data through conventional means.

Object Identifiers

As mentioned above, the row locator records also include an identifier of the database object (e.g. emp table 300) that contains the row (objd). The objd is primarily used for clean up of hash table 112. For example, assume that a table with objd=5 is changed from FAST-LOOKUP-OPTIMIZED to not FAST-LOOKUP-OPTIMIZED. Under these circumstances, the row locator records within hash table 112 are no longer useful. Therefore, to clean out those entries, database server instance 108 scans hash table 112 and deletes (or marks as deleted) all row locator records where objd=5.

Object identifiers may also be used to validate block data in combination with the rdba, described above. For example, in embodiments where the rdba is not unique, but the combination of rdba and objd is unique, both values must match the information in the row locator record to ensure that the correct block has been retrieved. Specifically, in such an embodiment, when requesting entity 104 retrieves block data from cache 110 using RDMA, the requesting entity 104 compares both the rdba and the object identifier stored in the row locator record with the rdba and the object identifier stored in the header of the retrieved block data. If the values do not match, then an error has occurred and the requesting entity 104 initiates remedial measures.

Slot Numbers

The slot # is used to locate the target data within a block once the block containing the target data is retrieved by the requesting entity 104 using a for-data-RDMA. For example, assume that rows 352, 354, 356 and 358 are the first four rows in block 408, and that they are stored within block 408 in that order. Under these circumstances, rows 352, 354, 356 and 358 respectively correspond to slots 0, 1, 2 and 3 of block 408.

After obtaining the data of block 408 using a for-data-RDMA, requesting entity 104 locates row 352 within the block data based on the fact that the row locator record for row 352 indicates slot #0. For example, in one embodiment, the header of block 408 will indicate the actual offset, within block 408, for each slot number. The slot number is used to determine the offset, and the offset is used to extract the row. Thus, because requesting entity 104 has the slot number of the row from the row locator record for the row, requesting entity 104 need not scan through the entire data block (which may be, for example 8K bytes of data) to locate the row that matches the specified key value.

The RDMA Access Information

As mentioned above, RDMA access information is provided to requesting entity 104 to enable requesting entity 104 to access data in the volatile memory 106 of machine 102 using RDMA. According to one embodiment, the RDMA access information thus provided includes the hash function used by hash table 112, one or more RDMA-authorization keys, and information about the regions of volatile memory 106 for which RDMA is allowed. The regions of volatile memory 106 for which RDMA is allowed include the region(s) storing hash table 112 and the regions(s) storing the cached data 114. The information about the regions may include, for example, the base address of hash table 12, the size of hash table 112, a bucket-number-to-virtual-address mapping and a block-number-to-virtual-address mapping. The bucket-number-to-virtual-address mapping indicates the virtual address of the hash table entry of each bucket and is used to get the address of the bucket for the for-location-RDMA. The block-number-to-virtual-address mapping indicates the virtual address of each cached block and is used to get the address of the block for the for-data RDMA. Rather than include the entire mappings in the RDMA access information, the RDMA access information may include information from which the mappings may be derived. For example, the RDMA access information may include a starting address and offsets from the starting address, rather than a full virtual address for each block number.

The RDMA-authorization keys are keys that authorize the requesting entity 104 to obtain information from server machine 102 using RDMA. Without the proper RDMA-authorization key, requesting entity 104 cannot access volatile memory 106 using RDMA. According to an embodiment, database server instance 108 only provides the RDMA-authorization key to requesting entity 104 after requesting entity has proven that requesting entity 104 can be trusted. Such proof may come in many forms, including but not limited to providing appropriate username/password information to database server instance 108.

Making the Network Interface Controller RDMA-Aware

In addition to transferring the RDMA access information to requesting entity 104, the preliminary steps for enabling RDMA access may also include database server instance 108 providing certain information to a network interface card (NIC) through which server machine 102 is coupled to a network. Specifically, according to an embodiment, database server instance 108 registers with its NIC which regions of volatile memory 106 are amenable to RDMA access. According to one embodiment, in response to the RDMA registration, the NIC provides the one or more authentication keys to the database server instance 108. As mentioned above, these keys are eventually provided to the requesting entity 104 so that requesting entity 104 can prove that it is authorized when making an RDMA access to volatile memory 106.

Determining the Location of the Bucket

For a given key-based query, the requesting entity 104 locally does a hash computation on the key and figures out which hash bucket to read from volatile memory 106. Specifically, the requesting entity 104 determines the bucket number based on some of the bits of the hash value produced by applying the hash function to the key. Based on the hash bucket number, the requesting entity 104 uses the bucket-number-to-address mapping to determine the address of the hash table entry associated with that bucket number. The requesting entity 104 then issues the appropriate for-location-RDMA read request (starting address of read, size of read) for the bucket data from the hash table entry that corresponds to the hash bucket. As shall be discussed in detail elsewhere, in some embodiments the for-location RDMA may read more than one bucket to account for the fact that the desired hash table entry may have overflowed into a subsequent bucket.

According to an embodiment, each entry of hash table 112 is aligned on CPU cache line boundary (64 bytes in size). Aligning the hash table entries in this manner results in atomicity, as RDMA reads on the granularity of CPU cache line are always atomic.

According to one embodiment, the closed addressing based hashing scheme described herein is used to ensure that there are no overflow bucket chains. The lookup on the hash index for a given key K is a constant time operation because there can be only two candidate buckets that can store the key K. The constant lookup time is a result of the strategy of not storing a hash entry at all if neither the target bucket of the bucket that follows the target bucket are too full to store the entry. As a result of this strategy, embodiments that read one bucket at a time will never have more than two for-location RDMAs, and embodiments that read two buckets at a time will never have more than one for-location RDMA.

If the key is not there is any of the candidate buckets, it is guaranteed to be not there in the hash index at all. The first candidate bucket is the result of local hash computation by the requesting entity 104. The requesting entity 104 issues an RDMA read on this bucket. If the key is not present (no key identifier matches) in the bucket, requesting entity 104 issues second RDMA read on the next candidate bucket. The second candidate bucket is adjacent to the first candidate bucket and it is straightforward to compute the address of the former from the latter.

Determining the Location of the Target Data

According to one embodiment, once the hash bucket (which may be 64 bytes) is transported to requesting entity 104, requesting entity 104 interprets the contents of bucket and, based on the contents of the bucket determines the location of the target data. In the present example, the target data is the value in the actual COLUMN (e.g. "name") that was mentioned in the SELECT query. The bucket data has meta-data to indicate if it is in flux (was under concurrent modification on the server). If the bucket is in flux, requesting entity 104 discards the bucket and retries the RDMA read operation. Consequently, the RDMA operations constitute latchless reads. Instead of retrying the RDMA read operation, requesting entity 104 can decide to use the conventional way of issuing queries to RDBMS. The mechanism for identifying in-flux data shall be described in greater detail hereafter.

Speculative RDMAS

The size of a data block may be much larger than the size of the data that is being retrieved. For example, each of blocks 402-432 may be 8K bytes, whereas row 352, which is the data needed to satisfy the query "SELECT name FROM emp WHERE ssn=123-45-6789", may be a small fraction of that amount.

Ideally, to minimize traffic, the for-data-RDMA would retrieve only the target data, and not the entire 8K block that contains the target data. However, the slot number contained in the row locator record merely indicates the sequential position of the row in the block, and not the actual address or offset of the row within the block. That actual offset is based on the size of the rows that, within the block, precede the row in question. Therefore, as those rows are updated and/or the block is compacted, the actual offset of a target row within the block will change.

According to one embodiment, the amount of data transferred in the for-data-RDMA is reduced by concurrently issuing a "speculative-RDMA" and a "block-header-RDMA". The speculative-RDMA is an RDMA for a subset of the block that based on an "approximate offset" and an "approximate size". The "block-header-RDMA" is an RDMA for retrieving just the header portion of the block that contains the target data.

The approximate offset for a row is an estimation of how far, into the block that contains the row, the actual data for the row begins. The approximate size is an estimation of the size of the data for the row. According to one embodiment, the approximate offset and the approximate size are additional values stored in the row locator record for each row. To increase the chances that speculative-RDMA actually retrieves the row data, the data requested in the speculative-RDMA may include padding before and after the memory range where the target row is estimated to reside.

For example, assume that the approximate offset, within block 408 for row 356 is "offsetX". Assume further that the approximate size of row 456 is sizeX, and that block 408 is stored at address ADDR1. Under these conditions, the speculative-RDMA to retrieve row 356 may request data from ((ADDR1+offset)−Prepadding) to ((ADDR1+offsetX+sizeX)+Postpadding). According to one embodiment, each of the Prepadding and Postpadding is 256 bytes. However, the actual size of the Prepadding and Postpadding may vary from implementation to implementation.

In one embodiment, the minimum granularity of an RDMA access is a cache line and each cache line is 64 bytes. Consequently, the approximate offset for each row may simply be the offset of the cache line, within volatile memory 106, that has the data of the row at the time the row locator record for the row is being created. By using the offset of the cache line, padding is effectively added to the request because a cache line is typically much larger than a single row of data.

The block header obtained by the block-header-RDMA may be used to determine whether the speculative-RDMA actually retrieved the target row. Specifically, in one embodiment, the block header contains a "slot array" that indicates the actual current offset of the row at each slot position. If the slot array within the block header indicates that the target row is within the data retrieved by the speculative-RDMA, then no further RDMA operations are needed to obtain the target data.

On the other hand, if the data obtained through speculative-RDMA fails to include the target row, then a subsequent RDMA may be issued (based on the information in the block header) to obtain the row. The data obtained through the subsequent RDMA is based on the offset of the target row that is specified in the slot array of the block header.

Non-Unique Key Embodiments

In the embodiments described above, it was assumed that RDMA is used only when the request is for a single row that matches a unique key value. However, in alternative embodiments, the key used to identify matching data may be non-unique. Because the keys are non-unique any number of rows may match a given key value. Thus, each row locator record may include location data for any number of rows. The retrieval of each of the rows may be made by issuing RDMA requests, for each row, in the manner described above.

If the number of RDMA requests needed to retrieve all of the rows that match a particular key value are higher than a particular threshold, then it would have been more efficient to simply request the data from the database server instance 108 in the conventional manner. Therefore, according to one embodiment, database server instance 108 only populates hash table 112 with row locator records that correspond to key values that match fewer than the threshold number of rows. When database server instance 108 parses and compiles a database command that specifies a key that matched more than the threshold number of rows at the time the hash table was created for the table, the database server instance 108 informs the requesting entity 104 that the command is not eligible for RDMA.

In an alternative non-unique key embodiment, separate row locator records may be stored for every row that matches a given key. If the bucket to which a key hashes does not have enough room for all row locator records, the row locator records can be stored in the next bucket. If there is no room in the next bucket, row locator records may not be stored at all, or conventional hash table overflow techniques may be used. For example, additional memory space for storing row locator records for a bucket may be chained to the hash table entry of the bucket. To ensure rows that have the given key are retrieved, the requesting entity issues RDMAs to "walk the chain" to retrieve all applicable row locator records, and then issues RDMAs to retrieve all matching rows.

Preventing Access to In-Flux Data

Database server instance 108 keeps cached data 114 up to date so that RDMA accesses to cached data 114 retrieve the latest version of the data items thus obtained. However, it is possible that a data item is being modified in cached data 114 at the same time that an RDMA is issued for the data item. Data items that are currently undergoing a modification are referred to herein as "in-flux" items. Because the state of the in-flux data items is changing, it is preferable that the requesting entity 104 avoid use of data that was obtained while in-flux.

To prevent the use of in-flux data, each block has a version number. Whenever database server instance 108 modifies a block, database server instance 108 first increments a version number maintained for the block (either in the block or elsewhere). After modifying the block, the database server instance 108 increments the version number again. Because the version number is incremented before and after a change, the version number will either (a) always be even when the block is in-flux, or (b) always be odd when the block is in flux. For the purpose of illustration, it shall be assumed that the version number is always odd when the block is in flux.

To detect situations where a block retrieved using RDMA was in-flux, the requesting entity 104 may send three pipelined RDMA requests. Because they are pipelined, the three RDMA requests are performed sequentially. The first and third requests are RDMA requests to read the block's version number, while the second RDMA request is to obtain the block itself. Using this technique, the requesting entity 104 can be assured that the block was not in-flux when (a) the block version numbers retrieved by the first and third requests match, and (b) the block version numbers are even. If the version numbers retrieved by the first and third requests do not match or are odd, then remedial measures are taken. In this context, remedial measures may simply be to send the three pipelined RDMA requests again.

Bucket data itself may also be in-flux. According to one embodiment, the bucket hash metadata to indicate whether or not the bucket is in flux. When a requesting entity parses the bucket data, the requesting entity inspects the metadata to determine whether the bucket was in flux at the time the bucket was retrieved. If the metadata indicates that the bucket was in flux, the requesting entity does not user the bucket data. Instead, the requesting entity may issue another RDMA to request the bucket again.

The Underlying Network Fabric

The RDMA techniques described herein assume an underlying network fabric to allow data transfers between the requesting entity 104 and the server machine whose volatile memory stores the cached data. Such an underlying network fabric may be, for example, an Infiniband Interconnect. However, the techniques described herein are not limited to any particular underlying network fabric.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
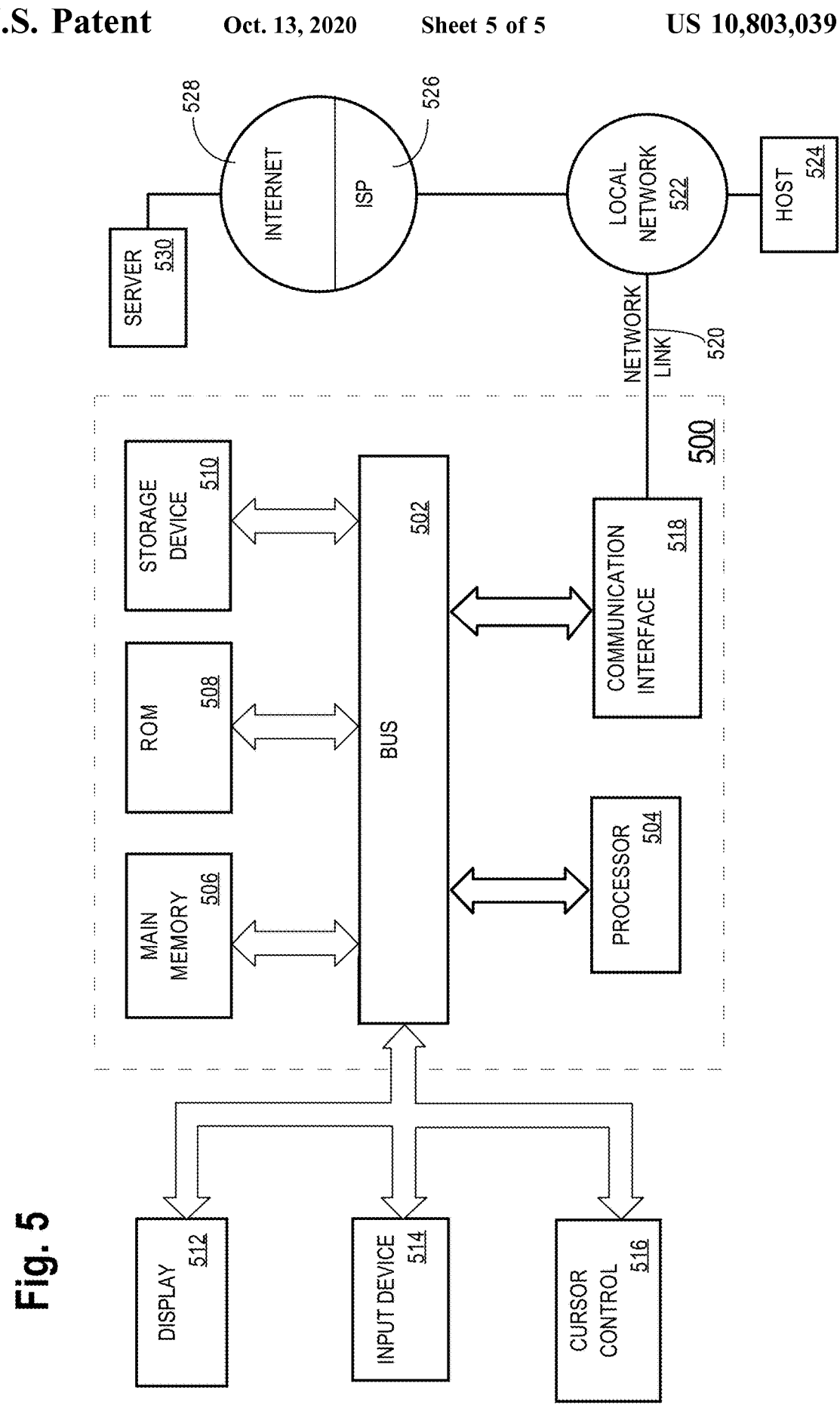
FIG. 5 is a block diagram of a computer system on which the techniques described herein may be executed.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
to obtain first target data managed by a database server instance executing on a server machine, a requesting entity determining whether the first target data is eligible for remote direct memory access (RDMA) retrieval;
responsive to determining that the first target data is not eligible for RDMA retrieval, sending a request to the database server instance to cause the database server instance to provide the first target data;
to obtain second target data managed by the database server instance, the requesting entity determining whether the second target data is eligible for RDMA retrieval;
responsive to determining that the second target data is eligible for RDMA retrieval, performing the steps of:
sending a for-location-RDMA to obtain location information from volatile memory of the server machine without involving the database server instance; and
based on the location information obtained by the for-location-RDMA, sending a for-data-RDMA to obtain the second target data from the volatile memory of the server machine without involving the database server instance;
wherein the method is performed by one or more computing devices.

2. The method of claim 1 wherein the requesting entity is on a client machine that is different from the server machine.

3. The method of claim 1 further comprising determining a virtual memory address for the for-location-RDMA by:
generating a hash value by applying a hash function to a unique key associated with the second target data;
identifying a bucket based on the hash value; and
determining a virtual memory address that corresponds to the bucket;
wherein the virtual memory address is an address of an entry, in a hash table that resides in the volatile memory of the server machine, that corresponds to the bucket.

4. The method of claim 1 further comprising determining a virtual memory address for the for-data-RDMA by:
determining a target tag that corresponds to a unique key associated with the second target data;
identifying a plurality of row locator records in the location information;
selecting a particular row locator record from the plurality of row locator records based on the particular row locator record having a particular tag that matches the target tag; and
using information from the particular row locator record to determine the virtual memory address for the for-data-RDMA.

5. The method of claim 4 wherein determining the target tag that corresponds to the unique key comprises:
prior to the for-location-RDMA, generating a hash value by applying a hash function to the unique key, wherein a first portion of the hash value is used to identify a hash bucket to retrieve using the for-location-RDMA; and
using a second portion of the hash value as the target tag.

6. The method of claim 1 wherein sending the for-data-RDMA to obtain the second target data from the volatile memory of the server machine without involving the database server instance includes:
based on the location information, determining an approximate location of the second target data within a block stored in the volatile memory of the server machine;
concurrently sending an RDMA to retrieve a header of the block, and an RDMA to retrieve data from the approximate location;
based on information in the header, determining whether the data retrieved from the approximate location includes the second target data; and
if the data retrieved from the approximate location does not include the second target data, then sending an RDMA to obtain the second target data based on the information in the header.

7. The method of claim 6 wherein determining the approximate location of the second target data includes reading, from the location information, an offset of a particular cache line within volatile memory of the server machine, wherein the particular cache line is the cache line in which the second target data was initially stored.

8. The method of claim 1 further comprising determining whether data retrieved by the for-data-RDMA is the second target data by comparing a key value associated with the second target data with a key value in a row obtained by the for-data-RDMA.

9. The method of claim 1 wherein sending the for-data-RDMA to obtain the second target data from the volatile memory of the server machine without involving the database server instance includes:
based on the location information, sending the for-data-RDMA to obtain an entire block, within the volatile memory of the server machine, that includes the second target data; and
after retrieving the entire block, the requesting entity using information in a header of the block to determine an offset of the second target data within the block; and extracting the second target data from the block based on the offset.

10. The method of claim 1 further comprising:
the database server instance determining that a set of data is FAST-LOOKUP-OPTIMIZED;
responsive to determining that the set of data is FAST-LOOKUP-OPTIMIZED, loading the set of data into the volatile memory of the server machine; and
building a hash table that includes records that indicate location information for data items in the set of data;
wherein the for-location-RDMA retrieves the location information from the hash table.

11. The method of claim 10 wherein:
the set of data is a database table that includes a plurality of rows; and
building the hash table comprises performing the following steps for each row of the plurality of rows:
identifying a unique key of said each row;
generating a hash value by applying a hash function to the unique key;
based on the hash value, selecting a bucket of the hash table;
storing, within the bucket, a row locator record for said each row;
wherein the row locator record for said each row includes information for locating said each row within the volatile memory.

12. The method of claim 11 wherein:
the row locator record includes an identifier for the database table, and
the method further comprises, in response to an event that causes the database table to no longer be FAST-LOOKUP-OPTIMIZED, using the identifier of the database table in the row locator record to determine that the row locator record is no longer valid.

13. The method of claim 11 wherein the information for locating a particular row, of the plurality of rows, includes:
a block number of a block containing the particular row; and
a slot number that indicates sequential position of the particular row within the block.

14. The method of claim 13 wherein the row locator record the row further includes a tag formed of bits extracted from the hash value.

15. The method of claim 1 wherein:
the for-data-RDMA is for data from a particular block; and
the method further comprises:
sending an RDMA to be executed before the for-data-RDMA to obtain a first block version number of the particular block; and
sending an RDMA to be executed after the for-data-RDMA to obtain a second block version number of the particular block; and
determining whether data retrieved by the for-data-RDMA was in-flux based, at least in part, on whether the first block version number matches the second block version number.

16. One or more non-transitory computer-readable media storing one or more sequences of instructions that, when executed by one or more computing devices, cause:
to obtain first target data managed by a database server instance executing on a server machine, a requesting entity determining whether the first target data is eligible for remote direct memory access (RDMA) retrieval;
responsive to determining that the first target data is not eligible for RDMA retrieval, sending a request to the database server instance to cause the database server instance to provide the first target data;
to obtain second target data managed by the database server instance, the requesting entity determining whether the second target data is eligible for RDMA retrieval;
responsive to determining that the second target data is eligible for RDMA retrieval, performing the steps of:
sending a for-location-RDMA to obtain location information from volatile memory of the server machine without involving the database server instance; and
based on the location information obtained by the for-location-RDMA, sending a for-data-RDMA to obtain the second target data from the volatile memory of the server machine without involving the database server instance.

17. The one or more non-transitory computer-readable media of claim 16, wherein the one or more sequences of instructions further comprise instructions that, when executed by one or more computing devices, cause determining a virtual memory address for the for-location-RDMA by:
generating a hash value by applying a hash function to a unique key associated with the second target data;
identifying a bucket based on the hash value; and
determining a virtual memory address that corresponds to the bucket;
wherein the virtual memory address is an address of an entry, in a hash table that resides in the volatile memory of the server machine, that corresponds to the bucket.

18. The one or more non-transitory computer-readable media of claim 16, wherein the one or more sequences of instructions further comprise instructions that, when executed by one or more computing devices, cause determining a virtual memory address for the for-data-RDMA by:
determining a target tag that corresponds to a unique key associated with the second target data;
identifying a plurality of row locator records in the location information;
selecting a particular row locator record from the plurality of row locator records based on the particular row locator record having a particular tag that matches the target tag; and using information from the particular row locator record to determine the virtual memory address for the for-data-RDMA.

19. The one or more non-transitory computer-readable media of claim 18 wherein determining the target tag that corresponds to the unique key comprises:
   prior to the for-location-RDMA, generating a hash value by applying a hash function to the unique key, wherein a first portion of the hash value is used to identify a hash bucket to retrieve using the for-location-RDMA; and
   using a second portion of the hash value as the target tag.

20. The one or more non-transitory computer-readable media of claim 16 wherein sending the for-data-RDMA to obtain the second target data from the volatile memory of the server machine without involving the database server instance includes:
   based on the location information, determining an approximate location of the second target data within a block stored in the volatile memory of the server machine;
   concurrently sending an RDMA to retrieve a header of the block, and an RDMA to retrieve data from the approximate location;
   based on information in the header, determining whether the data retrieved from the approximate location includes the second target data; and
   if the data retrieved from the approximate location does not include the second target data, then sending an RDMA to obtain the second target data based on the information in the header.

21. The one or more non-transitory computer-readable media of claim 20 wherein determining the approximate location of the second target data includes reading, from the location information, an offset of a particular cache line within volatile memory of the server machine, wherein the particular cache line is the cache line in which the second target data was initially stored.

22. The one or more non-transitory computer-readable media of claim 16, wherein the one or more sequences of instructions further comprise instructions that, when executed by one or more computing devices, cause determining whether data retrieved by the for-data-RDMA is the second target data by comparing a key value associated with the second target data with a key value in a row obtained by the for-data-RDMA.

23. The one or more non-transitory computer-readable media of claim 16 wherein sending the for-data-RDMA to obtain the second target data from the volatile memory of the server machine without involving the database server instance includes:
   based on the location information, sending the for-data-RDMA to obtain an entire block, within the volatile memory of the server machine, that includes the second target data; and
   after retrieving the entire block, the requesting entity using information in a header of the block to determine an offset of the second target data within the block; and
   extracting the second target data from the block based on the offset.

24. The one or more non-transitory computer-readable media of claim 16 wherein the one or more sequences of instructions further comprise instructions that, when executed by one or more computing devices, cause:
   the database server instance determining that a set of data is FAST-LOOKUP-OPTIMIZED;
   responsive to determining that the set of data is FAST-LOOKUP-OPTIMIZED, loading the set of data into the volatile memory of the server machine; and
   building a hash table that includes records that indicate location information for data items in the set of data;
   wherein the for-location-RDMA retrieves the location information from the hash table.

25. The one or more non-transitory computer-readable media of claim 24 wherein:
   the set of data is a database table that includes a plurality of rows; and
   building the hash table comprises performing the following steps for each row of the plurality of rows:
   identifying a unique key of said each row;
   generating a hash value by applying a hash function to the unique key;
   based on the hash value, selecting a bucket of the hash table;
   storing, within the bucket, a row locator record for said each row;
   wherein the row locator record for the said each row includes information for locating said each row within the volatile memory.

26. The one or more non-transitory computer-readable media of claim 25 wherein:
   the row locator record includes an identifier for the database table, and
   the one or more sequences of instructions further comprise instructions that, when executed by one or more computing devices, cause, in response to an event that causes the database table to no longer be FAST-LOOKUP-OPTIMIZED, using the identifier of the database table in the row locator record to determine that the row locator record is no longer valid.

27. The one or more non-transitory computer-readable media of claim 25 wherein the information for locating the a particular row, of the plurality of rows, includes:
   a block number of a block containing the particular row; and
   a slot number that indicates sequential position of the particular row within the block.

28. The one or more non-transitory computer-readable media of claim 26 wherein the row locator record the row further includes a tag formed of bits extracted from the hash value.

29. The one or more non-transitory computer-readable media of claim 16 wherein:
   the for-data-RDMA is for data from a particular block; and
   the one or more sequences of instructions further comprise instructions that, when executed by one or more computing devices, cause:
   sending an RDMA to be executed before the for-data-RDMA to obtain a first block version number of the particular block; and
   sending an RDMA to be executed after the for-data-RDMA to obtain a second block version number of the particular block; and
   determining whether data retrieved by the for-data-RDMA was in-flux based, at least in part, on whether the first block version number matches the second block version number.

30. The one or more non-transitory computer-readable media of claim 16 wherein the requesting entity is on a client machine that is different from the server machine.

* * * * *

UNITED STATES PATENT AND TRADEMARK OFFICE
CERTIFICATE OF CORRECTION

PATENT NO. : 10,803,039 B2  
APPLICATION NO. : 15/606322  
DATED : October 13, 2020  
INVENTOR(S) : Siddharth Teotia et al.

It is certified that error appears in the above-identified patent and that said Letters Patent is hereby corrected as shown below:

In the Claims

On Line 14 of Claim 25, should be amended as follows:
"wherein the row locator record for said each row".

On Lines 2-3 of Claim 27, should be amended as follows:
"media of claim 25 wherein the information for locating a particular row, of the plurality of rows, includes:".

Claim 28 depends on Claim 26. Instead, Claim 28 should depend from Claim 27.

Signed and Sealed this  
Twelfth Day of January, 2021

Andrei Iancu  
*Director of the United States Patent and Trademark Office*